US011260895B2

(12) United States Patent
Lingemann (10) Patent No.: US 11,260,895 B2
(45) Date of Patent: Mar. 1, 2022

(54) LOCKING DEVICE AND STEERING COLUMN ASSEMBLY

(71) Applicant: TRW Automotive GmbH, Alfdorf (DE)

(72) Inventor: Markus Lingemann, Bochum (DE)

(73) Assignee: ZF Automotive Germany GmbH, Alfdorf (DE)

( * ) Notice: Subject to any disclaimer, the term of this patent is extended or adjusted under 35 U.S.C. 154(b) by 63 days.

(21) Appl. No.: 16/628,127

(22) PCT Filed: Jul. 4, 2018

(86) PCT No.: PCT/EP2018/068121
§ 371 (c)(1),
(2) Date: Jan. 2, 2020

(87) PCT Pub. No.: WO2019/008054
PCT Pub. Date: Jan. 10, 2019

(65) Prior Publication Data
US 2020/0223472 A1 Jul. 16, 2020

(30) Foreign Application Priority Data

Jul. 7, 2017 (DE) ........................ 102017115276.8

(51) Int. Cl.
*B62D 1/184* (2006.01)
*B62D 1/187* (2006.01)
*B62D 1/185* (2006.01)

(52) U.S. Cl.
CPC ............ *B62D 1/184* (2013.01); *B62D 1/187* (2013.01); *B62D 1/185* (2013.01)

(58) Field of Classification Search
CPC ......... B62D 1/184; B62D 1/185; B62D 1/187
See application file for complete search history.

(56) References Cited

U.S. PATENT DOCUMENTS 5,555,772 A * 9/1996 Schneider .............. B62D 1/184
280/775
5,787,759 A * 8/1998 Olgren ................... B62D 1/184
280/777

(Continued)

FOREIGN PATENT DOCUMENTS

DE 102011119154 A1 5/2012
DE 102015226080 A1 6/2016

(Continued)

*Primary Examiner* — Laura Freedman
(74) *Attorney, Agent, or Firm* — Robert James Harwood (57) ABSTRACT

A locking device for an adjustable steering column assembly of a motor vehicle is described, comprising an operating unit which has at least one closed and one open position, a control element coupled to the operating unit, and at least one eccentric part which is actuated by the control element. A retaining part is provided, which interacts with the eccentric part in the closed position, wherein a locking portion of the eccentric part engages on an engaging portion of the retaining part in the closed position. The eccentric part has a force transmission portion which is substantially opposite to the locking portion, wherein the force transmission portion in the closed position rests against a support surface lying substantially opposite to the engaging portion. Furthermore, a steering column assembly is described.

14 Claims, 8 Drawing Sheets

(56) References Cited

U.S. PATENT DOCUMENTS

| | | | |
|---|---|---|---|
| 6,139,057 A | 10/2000 | Olgren et al. | |
| 6,419,269 B1 * | 7/2002 | Manwaring | B62D 1/184 280/775 |
| 6,659,504 B2 * | 12/2003 | Riefe | B62D 1/184 280/775 |
| 7,735,868 B2 * | 6/2010 | Ridgway | B62D 1/184 280/775 |
| 7,861,615 B2 * | 1/2011 | Harris | B62D 1/184 74/493 |
| 8,047,096 B2 * | 11/2011 | Ridgway | B62D 1/184 74/493 |
| 8,500,168 B2 * | 8/2013 | Goulay | B62D 1/184 280/777 |
| 8,505,408 B2 * | 8/2013 | Havlicek | B62D 1/195 74/493 |
| 8,671,795 B2 * | 3/2014 | Ozsoylu | B62D 1/184 74/493 |
| 8,783,717 B2 * | 7/2014 | Tinnin | B62D 1/184 280/777 |
| 8,888,131 B2 * | 11/2014 | Anspaugh | B62D 1/184 280/775 |
| 8,936,274 B2 * | 1/2015 | Burns | B60R 25/0211 280/775 |
| 8,978,510 B2 * | 3/2015 | Buzzard | B62D 1/184 74/493 |
| 9,381,935 B2 * | 7/2016 | Ishimura | B60R 25/02 |
| 9,545,943 B2 * | 1/2017 | Sakuda | B62D 1/192 |
| 9,623,895 B2 * | 4/2017 | Johta | B62D 1/192 |
| 9,738,304 B2 * | 8/2017 | Kwon | B62D 1/184 |
| 9,764,757 B2 * | 9/2017 | Buzzard | B62D 1/184 |
| 9,840,270 B2 * | 12/2017 | Tomiyama | B62D 1/184 |
| 10,717,457 B2 * | 7/2020 | Dubay | B62D 1/19 |
| 2009/0241721 A1 * | 10/2009 | Inoue | B62D 1/195 74/493 |
| 2011/0185839 A1 | 8/2011 | Inoue | |
| 2014/0000325 A1 | 1/2014 | Buzzard et al. | |

FOREIGN PATENT DOCUMENTS

| | | | | |
|---|---|---|---|---|
| JP | 2009143299 A | | 7/2009 | |
| WO | WO-2007058158 A1 | * | 5/2007 | ............ B62D 1/184 |

* cited by examiner

LOCKING DEVICE AND STEERING COLUMN ASSEMBLY

CROSS-REFERENCE TO RELATED APPLICATION

This application is a national stage of International Application No. PCT/EP2018/068121, filed Jul. 4, 2018, the disclosure of which is incorporated herein by reference in its entirety, and which claimed priority to German Patent Application No. 102017115176.8, filed Jul. 7, 2017, the disclosure of which is incorporated herein by reference in its entirety.

TECHNICAL FIELD

The invention relates to a locking device for an adjustable steering column assembly of a motor vehicle and a steering column assembly for a motor vehicle.

BACKGROUND

Steering column assemblies for motor vehicles are known from the prior art, which among other things, can be adjusted with respect to an axial direction and/or tilt direction. This can also be referred to as a vertically adjustable steering column assembly. Typically, such a steering column assembly comprises a locking device which locks a corresponding vertical adjustment of the steering column assembly in a dosed position of the locking device. If the locking device is in an open position, the vertical adjustment of the steering column assembly is possible. Typically, such a steering column assembly comprises an inner tube and an outer tube, which relative to one another, may be adjusted in particular telescopically in order to realize the vertical adjustment of the steering column assembly. The vertical adjustment includes both a tilt and a length adjustment of the steering column assembly.

An operator of the locking device can unlock the locking device via an operating unit to make a vertical adjustment of the steering column assembly, so that the steering column assembly is placed in a desired longitudinal position or pitch position. This can be accomplished by the operator, by pulling or pressing a steering wheel in the open position to adjust the inner tube and the outer tube relative to each other. The locking devices used can also be utilized to at least partially absorb the forces occurring in an impact, collision, or accident.

The steering column assemblies may have an activation mechanism (kinematics) via which the operation of the operating unit is transmitted accordingly to unlock the adjustment, so to release the clamping of the inner tube and the outer tube. A used activation mechanism is also referred to as "Head Over Pin" design, in which a plurality of pins interact with the operating unit, wherein these pins are aligned during the transition to the closed position. Then a corresponding axial opening stroke takes place, when the pins are transferred from the aligned position to a non-aligned position, as is the case in the open position. However, the resulting opening stroke is usually less than 2 mm, wherein manufacturing tolerances of up to 1.5 mm may be already present in the clamping mechanism between the outer tube and the inner tube. In this respect, in the worst case, only a stroke of about 0.5 mm is available.

SUMMARY

The object of the invention is therefore to provide a locking device and a steering column assembly, which may provide the desired characteristics such as adequate damping in a cost effective and efficient manner.

The object is achieved, according to the invention, by a locking device for an adjustable steering column assembly of a motor vehicle, comprising an operating unit which has at least one dosed position and one open position, a control element coupled to the operating unit, and at least one eccentric part actuated by the control element, wherein a retaining part is provided, which interacts with the eccentric part in the closed position, wherein a locking portion of the eccentric part engages on an engaging portion of the retaining part in the closed position, wherein the eccentric part has a force transmission portion, which is substantially opposite to the locking portion, and wherein the force transmission portion in the closed position rests against a support surface lying substantially opposite to the engaging portion.

The basic idea of the invention is to provide a locking capability that is rotationally actuated, and a clamp to provide the desired force absorption. Therefore, the locking device is suitable to be used in a steering column assembly having an activation mechanism formed in accordance with the "Head Over Pin" design. Since the eccentric part is actuated rotationally via the control element, no space of the already small axial opening stroke is required in an activation mechanism according to the "Head Over Pin" design in order to activate the locking device. The locking portion may be provided on an eccentrically formed portion of the eccentric part. The engaging portion may be designed for the corresponding locking portion. However, the locking portion and the engaging portion together do not form a positive locking, but only a frictional locking. This ensures, among other things, that the eccentric part may move relative to the retaining part in a predetermined direction corresponding to the direction of movement from the open position to the closed position, even when the eccentric part is in the closed position. This would not be possible in a positive locking. Such further movement may be initiated in case of an accident, as a result of which the clamping or locking effect would be further intensified. A Force is already transmitted via the force transmission portion in the closed position, so that the eccentric part further transmits a force available in the locking section via the force transmission portion. The support surface against which the force transmission portion rests in the closed position, may also be formed by the retaining part, so that the retaining part that is arranged, in particular, fixedly to the motor vehicle, receives the generated forces. The engaging portion and the support surface may thus be formed on a single-piece part, in particular, on the retaining part. Generally, the retaining part is a vehicle component that is rigidly connected to the vehicle body, for which reason it is fixed to the motor vehicle.

Due to the shape of the eccentric part it is ensured, among other things, that said eccentric part in the closed position is supported both on the engaging portion and on the support surface over the locking portion or the force transmission portion. In particular, in an accident situation, it is jammed between the engaging portion and the support surface.

According to a first embodiment, the retaining part, in particular the engaging portion may be oriented substantially perpendicular to the direction of travel of the motor vehicle, so that a tilt adjustment of the steering column assembly is locked in the closed position accordingly.

In another embodiment, the retaining part, in particular, the engaging portion may be oriented substantially parallel to the direction of travel of the motor vehicle, for example, on the outer tube, so that a longitudinal adjustment of the steering column assembly in the closed position is locked accordingly. Generally, two or more retaining parts may be provided, each interacting with an associated eccentric part, so that at the same time a tilt and longitudinal adjustment of the steering column assembly may be locked in the closed position. Consequently, thus formed locking device may be used for blocking or locking a tilt and/or longitudinal adjustment of the steering column assembly.

One aspect provides that the eccentric part has a receptacle for the control element, through which the control element extends with an actuating portion, wherein the actuating portion and the receptacle are formed in a manner that the control element is rotatable relative to the eccentric part. An additional adjustment distance is provided, by means of which the eccentric part may rotate relative to the control element. Since the control element extends through the eccentric part, in particular through the receptacle provided in the eccentric part, then the rotational activation of the locking device occurs, by means of which the release of the locking device (unlocking) does not require axial movement.

According to another aspect, the receptacle has at least one support section against which the actuating portion rests in the open position. Although the control element and the eccentric part are rotatable relative to each other, the control element may thus actuate the eccentric part directly.

According to a further aspect, the support section comprises at least two support areas which are shifted from each other by an angle, wherein the angle falls between 10° and 30°, in particular 20°. Via the corresponding angle the maximum relative adjustment distance is set, which the control element may travel relative to the eccentric part, in particular in a rotational manner. The two support areas are formed, for example, substantially with the same size.

In particular, the control element comprises a substantially round cross-section with at least one flattened portion, in particular wherein two flattened portions are provided, which are preferably parallel to each other. Over the flattened portion(s), the additional (rotational) motion range may be set, in which the control element may rotate relative to the eccentric part, in particular in the open position in which the control element via its actuating portion rests against a corresponding support section of the eccentric part. The two flattened portions may thus be arranged on opposite sides of the control element. The control element is for example formed as a control pin, i.e., a pin-shaped control element having a substantially circular cross section.

Another aspect provides that the support section is associated with at least one flattened portion. In this respect, the control element, via its flattened portion, interacts with the support section of the eccentric part. In particular, the flattened portion rests directly against the first support area in the open position, and/or against the second support area in the closed position. In the closed position, the flattened portion may rest against the second support area only when an additional force acts on the locking device, such as a vertical force component in an accident. Accordingly, in an extreme position, the control element may rest against the other support area, against which the control element over its actuating portion does not rest in the open position. If the control element has two flattened portions, the two flattened portions are each associated with a corresponding support section, wherein the respective support sections each have two support areas. The two support areas are arranged at opposite ends in the receptacle. Accordingly, when the locking device is in the open position, the control element rests against an associated support area over the two flattened portions. Due to the two support sections, each having two support areas shifted from each other by an angle, the receptacle in cross-section, substantially, has a butterfly shape.

According to one embodiment, the locking portion has an outwardly facing locking surface with a higher friction, in particular wherein the locking surface comprises a corrugation and/or a toothing. Accordingly, there is a higher friction between the retaining part and the locking portion. Even if the locking surface is formed by a corrugation or toothing, the respective projections are not engaged in the engaging portion of the retaining part in a manner to achieve a positive locking, by means of which a relative movement would no longer be possible out of the closed position.

The control element in the closed position may receive no force. This means that the eccentric part does not transmit forces to the control element in the closed position, Said forces in turn should be further transferred by the control element. Accordingly, the control element is exclusively an element designed for actuation, over which the eccentric part is rotationally adjusted between its open and closed positions.

Another aspect provides a spring which pretensions at least one eccentric part in the closed position, in particular wherein the spring is formed as a torsion and compression spring. The spring is pretensioned due to the relative rotation of the control element with respect to the eccentric part, wherein the spring operates on the eccentric part in the closed position, in a manner that said eccentric part is acted upon in the closed position. Accordingly, the spring has a corresponding torsional characteristic. In addition, the spring may serve as a compression spring to act upon the pins with a required pretension in an activation mechanism in accordance with the "Head Over Pin" Design.

According to another aspect, an adjusting member is provided, which interacts with the control element, and in particular it is non-rotatably coupled to the control element. A coupling between an inner tube and an outer tube of the steering column assembly may be built on the adjusting member, which interacts with other components of the adjustment mechanism or clamping mechanism. Accordingly, the adjusting member may be rotationally coupled to the control element which in turn is non-rotatably coupled to the operating unit. The adjusting member may indirectly interact with a tooth block, via which a longitudinal adjustment of the steering column assembly may be locked, unless this is accomplished via a correspondingly formed eccentric part and a retaining part. In particular, the adjusting member has an entrainment portion which interacts with the spring. Thus, the spring is pretensioned upon rotation of the control element, since the spring is entrained via the rotating adjusting member and deflected accordingly.

Upon rotation or operation of the control element in the closed position, the control element is therefore rotated, as a result of which said control element first rotates relative to the eccentric part and then turns the adjusting member. The adjusting member pretensions the spring via its entrainment portion, so that the spring acts upon the eccentric part in its closed position. In the closed position, the eccentric part is pretensioned accordingly.

In particular, the locking device comprises a locking mechanism with an adaptive load absorption. This means that in the event of a higher load, for example in an accident, the locking mechanism automatically is intensified to be able to dissipate the generated load. This may simply occur in a manner that the locking portion of the eccentric part, due to the increased friction in the event of a higher load, is meshed deeper into the associated retaining part, in particular into the correspondingly designated engaging portion of the retaining part. The higher the force, the greater the rotation of the eccentric part is, which leads to a deeper meshing of the locking portion, as a result of which a correspondingly higher clamping force is produced between the inner tube and the outer tube. The retaining part may be arranged in a manner that it locks the longitudinal adjustment or tilt adjustment of the steering column assembly, provided that the correspondingly associated eccentric part is engaged. At the same time the eccentric part then presses the support surface more strongly while deforming it, in a manner that the eccentric part becomes jammed between the engaging portion and the support surface.

Furthermore, the object is achieved according to the invention by a steering column assembly for a motor vehicle, comprising an inner tube, an outer tube and an adjustment mechanism, via which the relative position of the inner tube with respect to the outer tube is adjustable, wherein the adjustment mechanism comprises a control element, which interacts at least with one pivotable eccentric part, via which the adjustment mechanism is locked in a dosed position, wherein the eccentric part directly engages on an engaging portion in a dosed position, and rests against a substantially opposite support surface over a force transmission portion. In this sense, this means that the locking of the steering column assembly or the corresponding adjustment mechanism is rotationally released or locked. Therefore, it is not necessary that the activation mechanism provides a sufficiently large axial opening stroke, since the adjustment mechanism or locking mechanism does not require additional space of the already small opening stroke. The adjustment mechanism and the locking mechanism is/are rotationally actuated. Generally, at least one eccentric part may be provided for locking a tilt adjustment and/or a longitudinal adjustment of the steering column assembly.

Specifically, a clamping mechanism is provided which has a clamping function with adaptive load absorption. This means that in the event of a higher load, for example in an accident, the clamping mechanism automatically is intensified to be able to dissipate the generated load. This may simply occur in a manner that the locking portion of the eccentric part, due to the increased friction in the event of a higher load, is meshed deeper into the associated retaining part, in particular into the correspondingly designated engaging portion of the retaining part. The higher the force, the greater the rotation of the eccentric part is, which leads to a deeper meshing of the locking portion, as a result of which a correspondingly higher clamping force is produced between the inner tube and the outer tube. The retaining part may be arranged in a manner that it blocks the longitudinal adjustment or tilt adjustment of the steering column assembly, provided that the correspondingly associated eccentric part is engaged. At the same time, the eccentric part then presses the support surface more strongly while deforming it, in a manner that the eccentric part becomes jammed between the engaging portion and the support surface.

One aspect provides that the control element in the closed position receives no force. In this respect, the control element does not absorb forces in the closed position, for which reason the control element is solely used to actuate the eccentric part. In particular, the steering column assembly comprises a locking device of the aforementioned type. The aforementioned advantages are applied in an analogous manner for the steering column assembly.

BRIEF DESCRIPTION OF THE DRAWINGS

Further advantages and features of the invention will become apparent from the following description and the drawings to which reference is made. Shown by the drawings.

DETAILED DESCRIPTION

Figure 1:
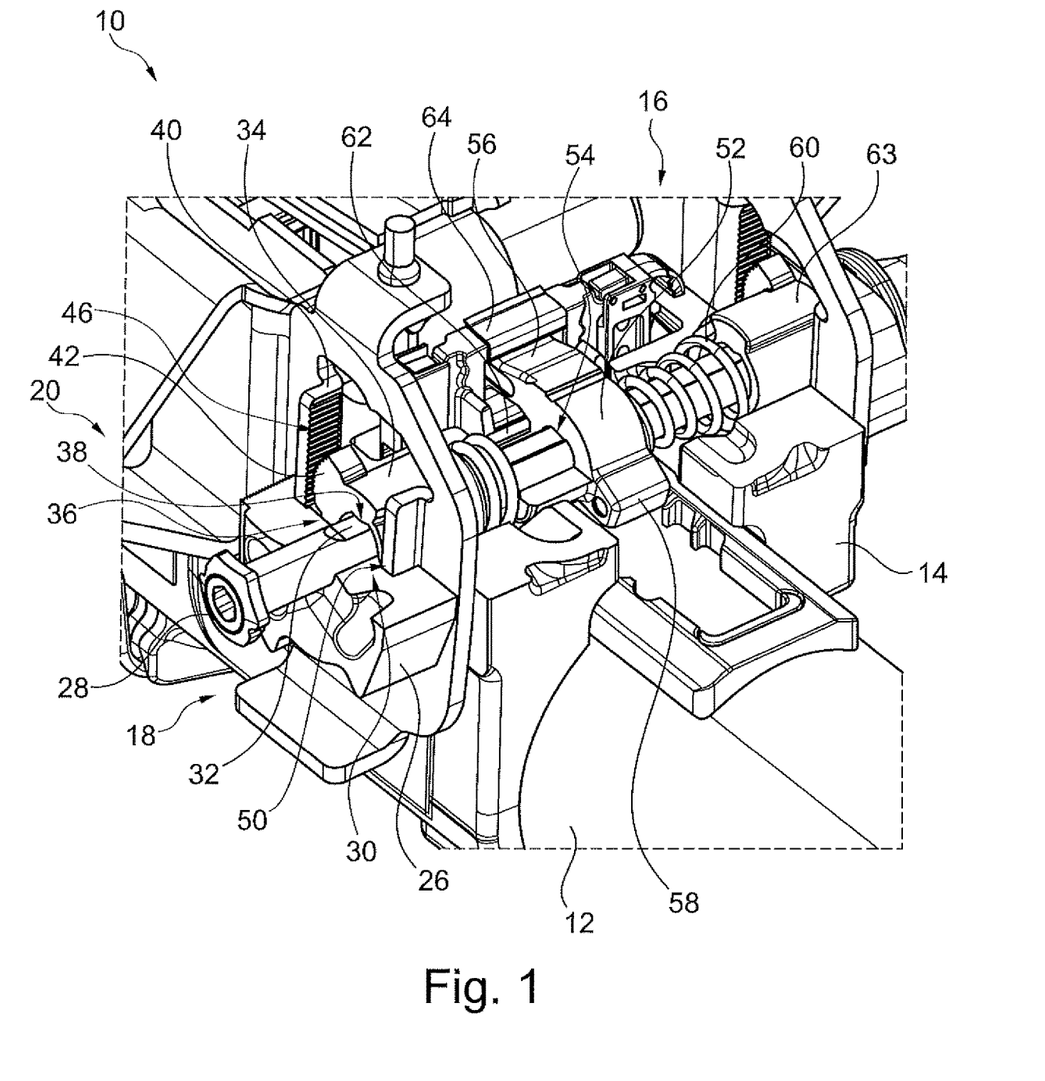
FIG. 1 is a perspective view of a steering column assembly according to the invention, according to a first embodiment of a locking device.
Figure 2:
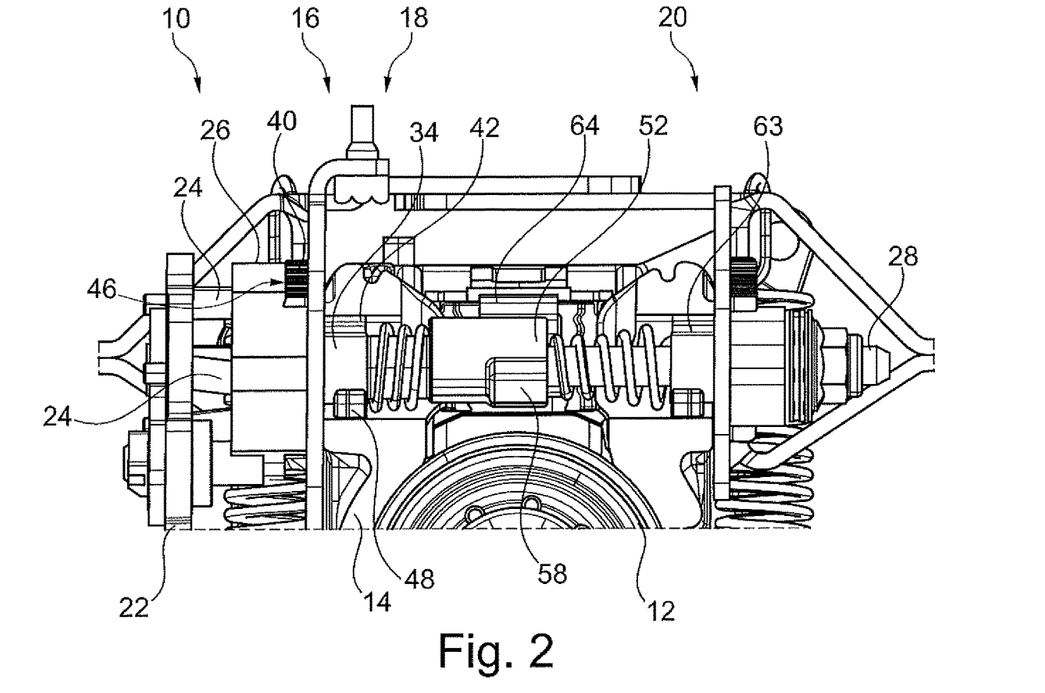
FIG. 2 is a side view of the steering column assembly of FIG. 1.

In FIGS. 1 and 2, a steering column assembly 10 for a motor vehicle is shown according to a first embodiment, comprising an inner tube 12 and an outer tube 14, which may be adjusted relative to each other via an adjustment or clamping mechanism 16, in particular the tilt and the length of the steering column assembly 10, for example in a telescopic manner. Furthermore, the steering column assembly 10 includes a locking mechanism 18 which is provided by a locking device 20.

Both the adjustment mechanism 16 and the locking device 20 together comprise a common operating unit 22 which may be moved by a vehicle occupant or operator between a closed position and an open position. The operating unit 22 is formed for example as a lever, which interacts with a non-rotatably arranged pin disc 26 via pins 24, as shown in the embodiment. The operating unit 22 may be rotated relative to the pin disc 26, via the pins 24 that are received in the pin disc 26, to transfer the operating unit 22 into the open position. In this case, the pins 24 are moved from their aligned position to provide an axial opening stroke. This is generally referred to as the "Head Over Pin" design.

Figure 3:
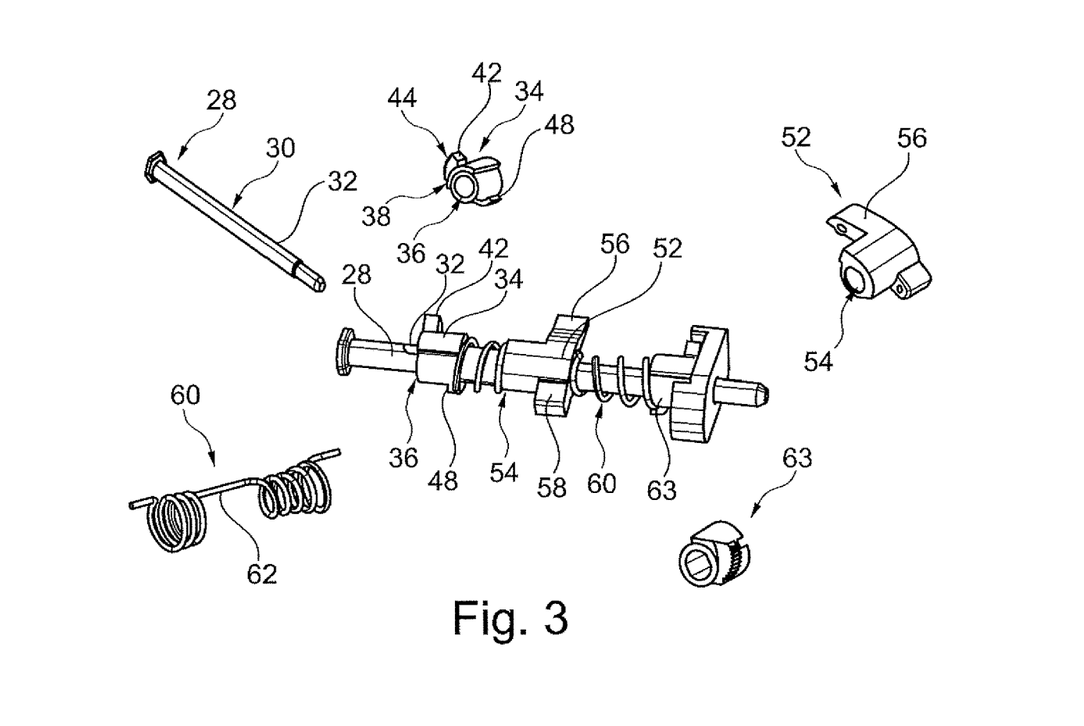
FIG. 3 is a separately shown detail of FIG. 2 in the assembled state and in an exploded view.

The operating unit 22 is non-rotatably coupled to a control element 28, so that the rotation of the operating unit 22 (from the closed position to the open position or vice versa) is properly transmitted to the control element 28, which is formed as a control pin in the embodiment shown, in particular as seen in FIG. 3, which shows the components of the locking mechanism 18 separately. The pin-shaped control element 28 has an actuating portion 30, which is defined in particular by its contour. In the actuating portion 30, the control element 28 has a substantially round cross-section with two flattened portions 32, which are parallel to each other, as will be explained below with reference to FIGS. 4 to 6.

The control element 28, which is simultaneously associated with the locking device 20 and the adjustment mechanism 16, actuates an eccentric part 34, which has a receptacle 36 for the control element 28. Therefore, the control element 28 extends with its actuating portion 30 through the receptacle 36, which has a support section 38 against which the actuating portion 30 rests in the open position, as will be explained below with reference to FIGS. 4 to 12.

FIGS. 1 to 3 show that the locking device 20 further comprises a retaining part 40, which interacts with the eccentric part 34, in particular with a locking portion 42 of the eccentric part 34, which has an outwardly facing locking surface 44 with a higher friction. The locking portion 42 is an eccentrically arranged section of the eccentric part 34, wherein said corresponding outwardly facing locking surface 44 comprises a corrugation in the embodiment shown. Alternatively, a toothing or the like may be provided to ensure the higher friction of the locking surface 44. In the closed position, the locking surface 44 interacts with an engaging portion 46 of the retaining part. 40 to lock the adjustment mechanism 16 by means of the locking device 20, so that it is not possible to adjust the steering column assembly 10. In the embodiment shown, a pitch movement of the steering column assembly 10 is locked via the retaining part 40. The engaging portion 46 of the retaining part 40 then extends substantially perpendicular to the direction of movement of the motor vehicle or substantially perpendicular to the axis of the inner tube 12 or the outer tube 14.

In addition, the eccentric part 34 includes a force transmission portion 48 which is arranged substantially opposite to the locking portion 42. In the closed position, the force transmission portion 48 rests against a support surface 50 which is also formed by the retaining part 40. The support surface 50 is arranged substantially opposite to the engaging portion 46 so that the retaining part 40 may be formed for example as a clamp, which includes both the engaging portion 46 and the support surface 50.

In general, the retaining part 40 may be formed as a single piece and fixedly arranged to the motor vehicle. Furthermore, both the adjustment mechanism 16 and the locking mechanism 18, more specifically, the locking device 20 comprises an adjusting member 52, which is designed separately from the eccentric part 34. The adjusting member 52 also has a receptacle 54 through which the control element 28 extends, in particular its actuating portion 30, in a manner that the adjusting member 52 may also be rotationally actuated by the control element 28, as explained below. In addition, the adjusting member 52 includes an entrainment portion 56 and a contact portion 58, which interact with the inner tube 12, as explained below with reference to FIGS. 8 to 12.

The entrainment portion 56, however, is associated among other things, to a spring 60 which extends along the control element 28, in particular, it encircles the control element 28. The spring 60 is designed as a compression and torsion spring, wherein the spring 60 comprises an entrainment portion 62 which interacts with the entrainment portion 56 of the adjusting member 52 in order to generate a pretension. The spring 60 transfers this pretension to the eccentric part 34, so that the eccentric part 34 is pretensioned in the closed position accordingly. Consequently, the spring 60 is mounted on the eccentric part 34, in particular is received at the end of the eccentric part 34. Furthermore, the adjustment mechanism 16 and the locking device 20 comprise a further eccentric part 63, which is formed in an analogous manner to the first eccentric part 34. The operation of this further eccentric part 63 corresponds to that of the first eccentric part 34. In this respect, reference is made to the previous and following statements. The two eccentric parts 34, 63 are associated with opposite ends of the control element 28, wherein they each interact with correspondingly formed retaining parts 40, of which two are also provided.

The adjusting member 52, which is a member of the adjustment mechanism 16 interacts with a spring element 64, which is also associated with the clamping or adjustment mechanism 16. The spring element 64 is provided between the outer tube 14 and the inner tube 12, as is shown in particular in FIGS. 8 to 12, in which the clamping or adjustment mechanism 16 is shown schematically.

The clamping or adjustment mechanism 16 includes, in addition to the spring element 64, a tooth block 66 that interacts with a corresponding toothed part 68, which is associated with the inner tube 12, so as to ensure a force-locking between the inner tube 12 and the outer tube 14. Accordingly, a longitudinal adjustment of the steering column assembly 10 may be adjusted here, in particular a telescopic longitudinal adjustment, in which the inner tube 12 and the outer tube 14 are moved relative to each other in the axial direction. For this purpose, the tooth block 66 is coupled to a force transmission element 70, which is in turn coupled to the outer tube 14, as will be explained below regards to the operation shown in FIGS. 8 to 12.

Figures 4, 5:
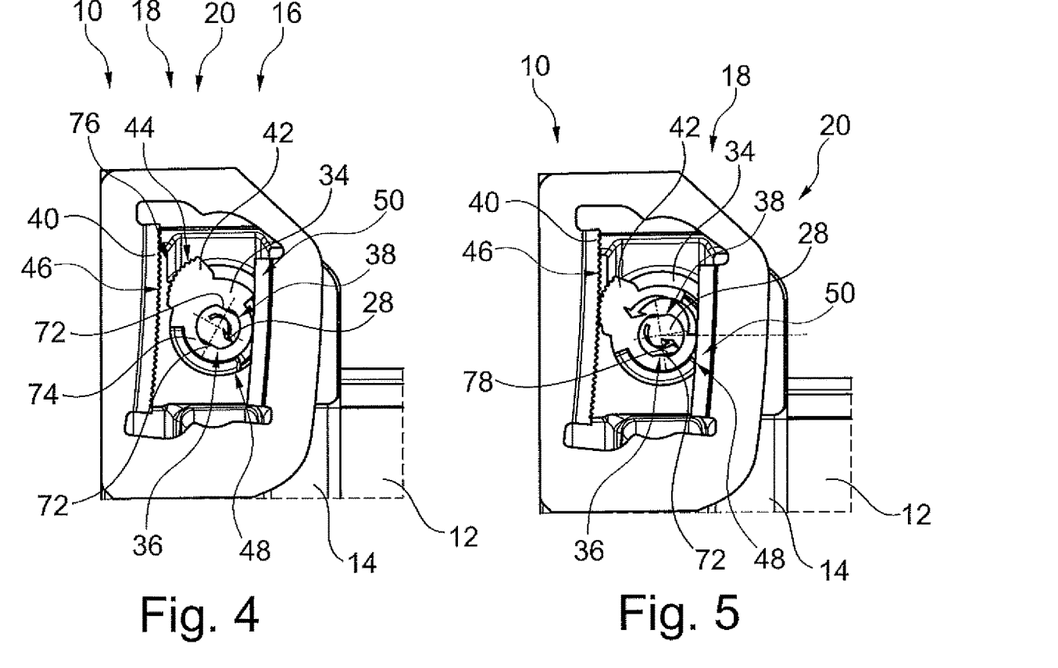
FIG. 4 is a side view of the steering column assembly of FIG. 1 in an open position.
FIG. 5 is the view of FIG. 4 in a closed position.
Figure 6:
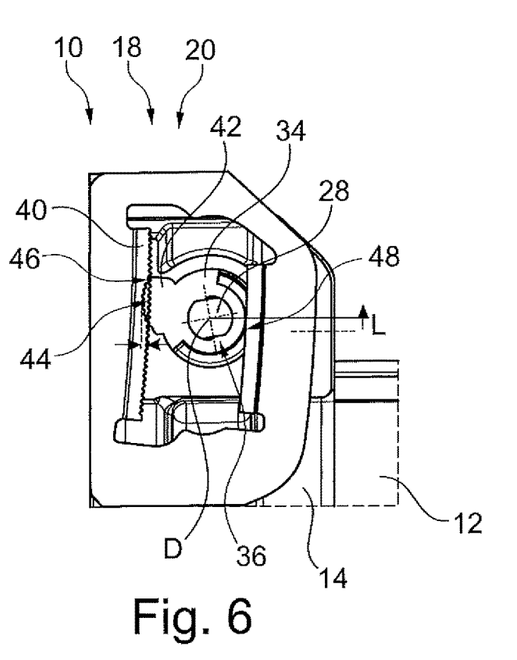
FIG. 6 is the view of FIG. 4, in an accident situation.
Figure 7:
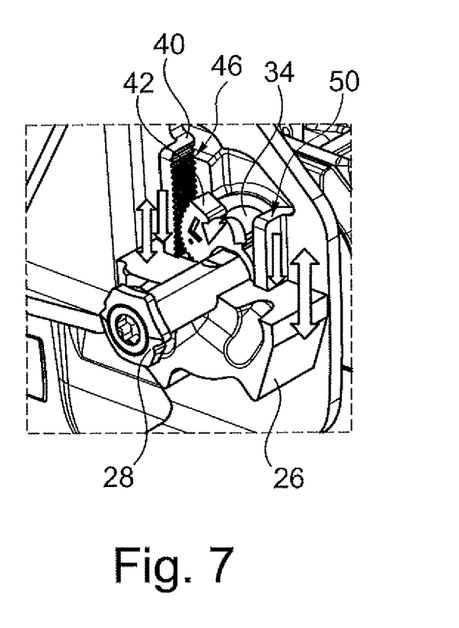
FIG. 7 is a detail of the locking device according to FIG. 1 in order to illustrate the forces occurring in an accident situation.

Below it is described with reference to FIGS. 4 to 6, how the locking mechanism 18 or the locking device 20 in the adjustable steering column assembly 10 allows a relative movement of the inner tube 12 to the outer tube 14 in the open position, and how it locks a corresponding relative movement in the closed position (FIG. 5).

In the open position shown in FIG. 4, the operating unit 22 is in stop position, so that the control element 28 with its flattened portions 32 rests directly against a first support area 72 of the support section 38, in a manner that a mechanical contact is present. However, the control element 28 in the open position does not rest against a second support area 74 of the corresponding support section 38, which is shifted by an angle $\alpha$ relative to the first support area 72. See also FIG. 8c. The receptacle 36 of the eccentric part 34 is formed so that it comprises two support sections 38 that are associated with the two flattened portions 32 of the control element 28.

As is apparent from FIG. 4, in the open position, there is a free space 76 between the locking portion 42 and the engaging portion 46, so that no locking is enabled for the adjustment mechanism 16. Accordingly, the inner tube 12 and the outer tube 14 may move relative to one another, in particular to set the pitch position of the steering column assembly 10. When the operating unit 22 is set to its closed position (FIG. 5), the operating unit 22 is adjusted accordingly, which means the control element 28 is rotated counterclockwise. This results in a clearance 78 between the flattened portion 32 and the respective first support area 72 because the control element 28 no longer rests against the support section 38, in particular against the first support area 72.

The locking surface 44 of the eccentric part 34 is adjusted in a manner that it engages on the engaging portion 46 of the retaining part 40, since upon rotation of the control element 28, the adjusting member 52 coupled to the control element 28 is likewise turned in a manner that the entrainment portion 56 of the adjusting member 52 interacts with the entrainment portion 62 of the spring 60 in order to pretension said parts. The spring 60 acts upon the eccentric part 34 in the position shown in FIG. 5, in which the locking portion 42 interacts with the engaging portion 46. This creates a higher friction of the eccentric part 34 at the side associated with the locking portion 42 as compared with the side associated with the force transmission portion 48.

Due to the relative rotation of the control element 28 with respect to the eccentric part 34, a pretensioning force acts upon the eccentric part 34 in the closed position, in particular on the locking portion 42, which further acts upon said eccentric part 34 in the direction of movement from the open position to the closed position.

From a comparison between FIGS. 4 and 5, it is apparent in particular that the tilt adjustment of the steering column assembly 10 may be made continuously, since the eccentric part 34 may be moved in the open position relative to the retaining part 40 until it has achieved the desired height adjustment (pitch position). Then the locking device 20 is transferred into the closed position in order to fix the corresponding position. In the event of an accident, if the locking device 20 is in the closed position (FIGS. 6 and 7), the occurring force, in particular its vertical force component, generates a relative movement of the outer tube 14 with respect to the vehicle-fixed retaining part 40, as a result of which the rotation axis D of the control element 28 and the eccentric part 34 are displaced by a distance L (See FIG. 6).

Here, the eccentric part 34 is rotated due to the pretension by the spring 60 and the higher friction on the side of the eccentric part 34 associated with the locking portion 42, in a manner that the locking portion 42 engages on the engaging portion 46 of the retaining part 40. In other words, this means that the eccentric part 34 unrolls over its locking portion 42 on the retaining part 40 due to the higher friction there, particularly on the engaging portion 46 of the retaining part 40. The clamping force originated in the closed position by the clamping mechanism 16 is further intensified due to the engagement. The locking portion 42, in particular the locking surface 44 is correspondingly shaped in order to support the unrolling.

Generally, because of this, an adaptive load absorption of the clamping or adjustment mechanism 16 is guaranteed due to the corresponding design of the locking mechanism 18, since the eccentric part 34 rotates more strongly when a higher force is introduced, by means of which the eccentric part 34 is meshed more deeply in the engaging portion 46 via its locking portion 42, which in turn leads to a higher clamping or locking force in an accident situation.

In an accident situation, a load is transmitted via a bearing from the steering shaft to the inner tube 12, which further transmits the load to the outer tube 14 accordingly. If the outer tube 14 is moved, the load is transmitted from the outer tube 14 to the eccentric part 34, wherein the higher friction in the region of the locking portion 42 leads to a corresponding rotational or pivotal movement of the eccentric part 34. Due to the shape of the eccentric part 34, said eccentric part 34 unrolls over the retaining part 40 whilst deforming the retaining part 40 accordingly, whereas on one hand, it is meshed in the engaging portion 46, and on the other hand, it acts upon the support surface 50 over its force transmission portion 48. At the same time, the clearance 78 between the flattened portion 32 and the first support area 72 is closed again, since the control element 28 again comes into mechanical contact with the eccentric part 34. Furthermore, the control element 28 comes into mechanical contact with the pin disc 26 which is fixedly arranged, so that the correspondingly generated forces are absorbed by the pin disc 26 (at least partially).

In general, thus, a frictional locking between the eccentric part 34 and the retaining part 40 is present in the closed position, since the eccentric part 34 may be engaged even if it is not in the closed position, which is not possible in a positive locking. In addition, this frictional locking allows that the locking mechanism 18 may be continuously adjusted, since there is no shape-related clamping force. In this respect, the handling is improved accordingly.

Figure 8:
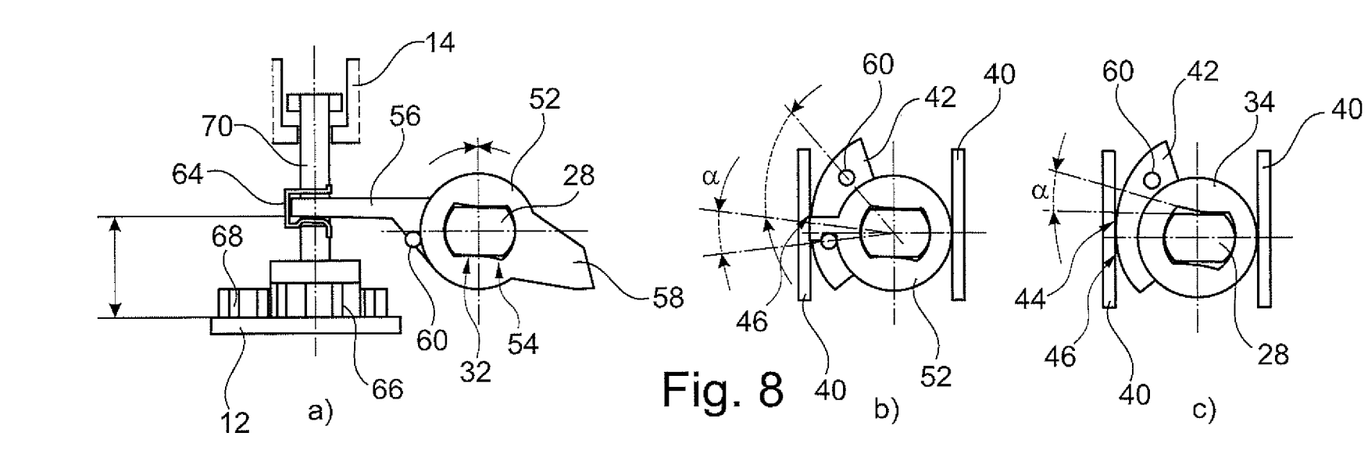
FIG. 8 is a schematic overview illustrating a clamping and locking mechanism in a closed position.

With reference to the FIGS. 8 to 12, it is explained below how the sequence for opening the locking mechanism 18 takes place by means of the locking device 20. In the illustration shown in FIG. 8, the locking device 20 and the adjustment mechanism 16 is located in the closed position in which a relative movement between the inner tube 12 and the outer tube 14 is not possible, as can be seen in FIG. 8a, in which it is shown that the tooth block 66 engages the toothed part 68 to couple the outer tube 14 with the inner tube 12. In this dosed position, the spring element 64 is compressed, which interacts with the force transmission element 70. Furthermore, it is apparent from FIGS. 8b and 8c that the spring 60 formed as a compression and torsion spring is pretensioned due to the adjusting member 52, in particular at an angle of 20°. In the closed position, the eccentric part 34 via its locking portion 42 engages on the engaging portion 46 of the retaining part 40, wherein the pretension of the spring 60 makes the eccentric part 34 to be further acted upon in the direction of movement from the open position towards the closed position.

It is also apparent from FIG. 8 that the receptacle 36 of the eccentric part 34, has a substantially butterfly shape in cross-section due to the two support sections 38, each having two support areas 72, 74 shifted from each other by an angle α. In the embodiment shown, the angle α is 20°. The receptacle 54 of the adjusting member 52 is formed substantially similar to the receptacle 36 of the eccentric part 34, since the receptacle 54 of the adjusting member 52 has a substantially butterfly shape in cross-section.

However, the supports formed in the receptacle 54 of the adjusting member 52 are shifted from each other by a smaller angle than the angle α. This results in the relative rotation of the control element 28 with respect to the adjusting member 52, which is less than the relative rotation of the control element 28 with respect to the eccentric part 34, as will be explained below.

Figure 9:
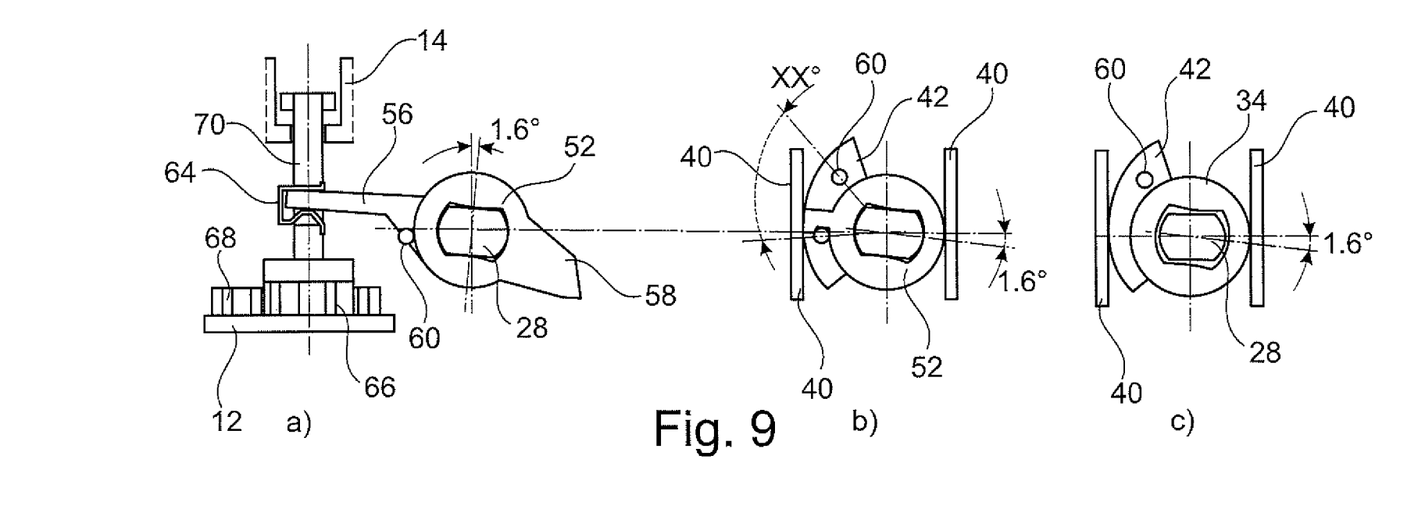
FIG. 9 is the overview of FIG. 8 in a position in which a pretensioned spring has been released.

In FIG. 9, the spring element 64 is not pretensioned anymore due to a rotation of the control element 28, as can be seen in particular from the position of the entrainment portion 56, which engages with the spring element 64. Please see FIGS. 1 and 2. This is achieved, for example, with a rotation of the control element 28 by 1.6°. So, the achieved adjustment distance corresponds, for example, to a spring deflection of 0.5 mm of the spring element 64. In this position, the locking portion 42 of the eccentric part 34 is still in engagement with the engaging portion 46 of the retaining part 40, as is apparent from the FIGS. 9b and 9c.

In addition, it is apparent from FIG. 9a that the adjusting member 52 has rotated relative to the control element 28 due to the pretension of the spring element 64, since the flattened portions 32 of the control element 28 now do not rest against any associated support of the receptacle 54 of the adjusting member 52. This is particularly clear from a comparison of FIGS. 8a and 9a. Likewise, the eccentric part 34 has rotated relative to the control element 28, which occurs due to the pretension of the spring 60, as a comparison of FIGS. 8b and 9b or 8c and 9c shows.

Figure 10:
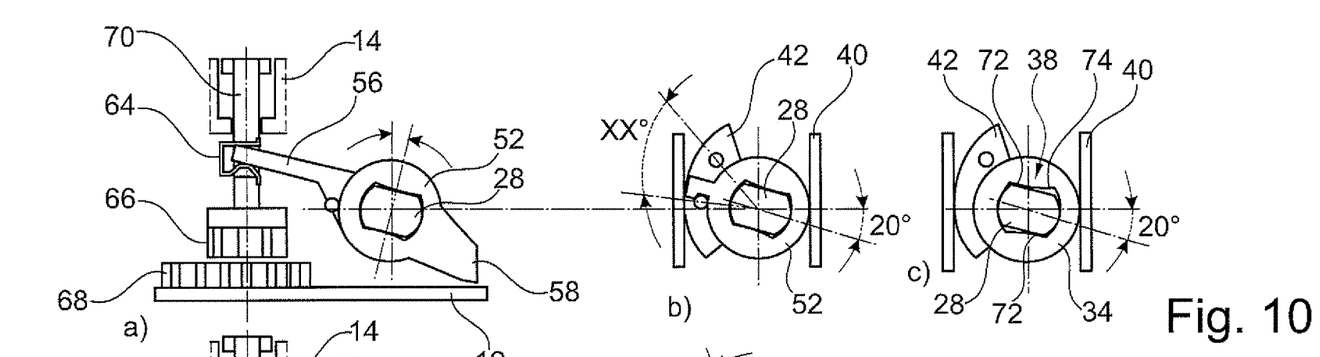
FIG. 10 is the overview of FIG. 8 in a position in which an adjustment mechanism has been activated.

In FIG. 10, the adjustment mechanism 16 provided for the longitudinal adjustment has already been transferred into its open position, as can be seen from FIG. 10a, since the tooth block 66 is no longer engaged with the toothed part 68. In this respect, the inner tube 12 and the outer tube 14 now may be (telescopically) adjusted to each other. The control element 28 has been rotated by 20° relative to its closed position, which corresponded to the pretension of the spring 60. In this respect, the flattened portions 32 of the control element 28 are now mechanically in contact with the first support areas 72 of the respective support sections 38. Accordingly, the adjusting member 52 has been rotated relative to the eccentric part 34 due to the rotation of the control element 28, in a manner that the pretension of the spring 60 has been removed.

The position shown in FIG. 10 thus corresponds to the unlocking position, from which the unlocking of the locking mechanism 18 takes place, if the control element 28 is further rotated clockwise. In this unlocking position, the locking portion 42 via its locking surface 44 rests against the retaining part 40, as is apparent from the FIG. 10c. In this respect, a tilt adjustment of the steering column assembly 10 is not yet possible. As already explained, the adjusting member 52 and the eccentric part 34 may be moved independently relative to the control element 28 so that the relative rotation between the adjusting member 52 and the eccentric part 34 is present to pretension the eccentric part 34 in the closed position, accordingly. In addition, the second support areas 74 of the respective support sections 38 do not necessarily rest against the flattened portions 32 in the closed position, as shown in FIG. 8. This may be the case, but must not necessarily be so, since the pretensioned spring 60 acts upon the corresponding eccentric part 34.

Figure 11:
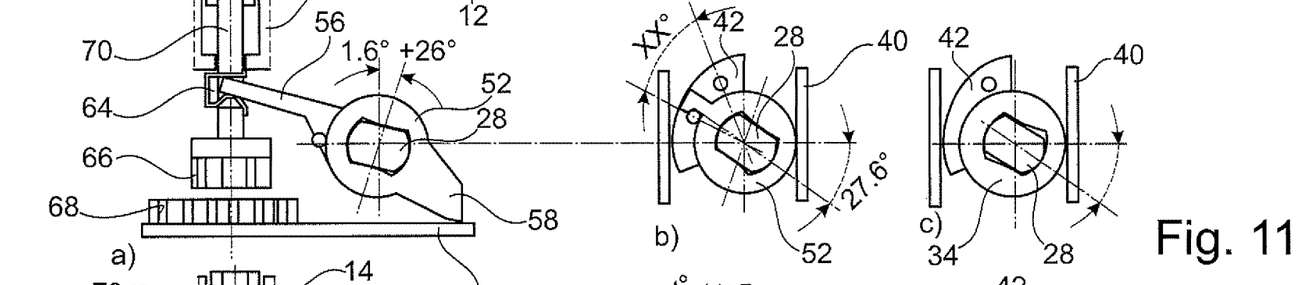
FIG. 11 is the overview of FIG. 8 in which an adjusting member contacts an inner tube.

In FIG. 11, the control element 28 has been rotated further towards the open position, so that the contact portion 58 of the adjusting member 52 comes into contact with the inner tube 12. As can be seen from FIG. 11c, the control element 28 rotates, which via its flattened portion 32 rests against the first support area 72 and the eccentric part 34, in a manner that the locking portion 42 becomes disengaged out of the engaging portion 46 of the retaining part 40 to be transferred into the open position. This happens for example with a rotation of the control element 28 by an angle of 27.6° from its closed position. Now, a tilt adjustment of the steering column assembly 10 is possible.

Figure 12:
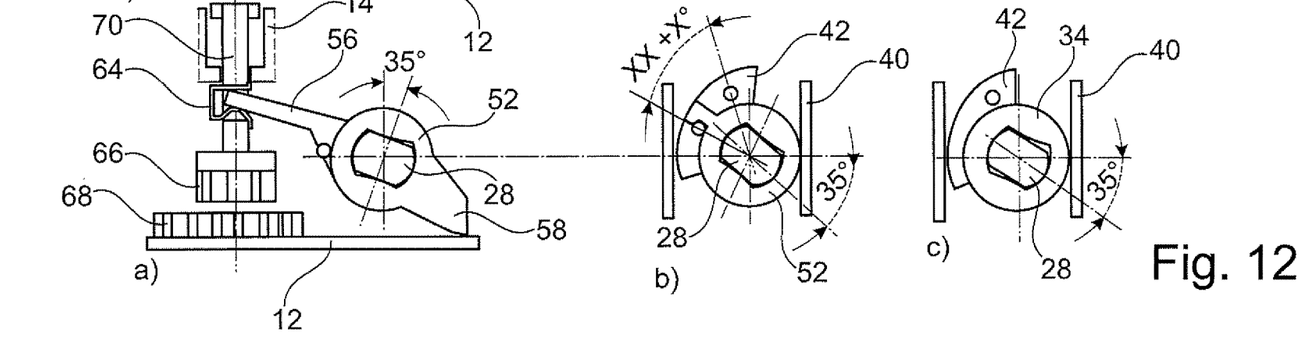
FIG. 12 is the overview of FIG. 8, in which the adjusting member is pretensioned in the open position.
Figure 13:
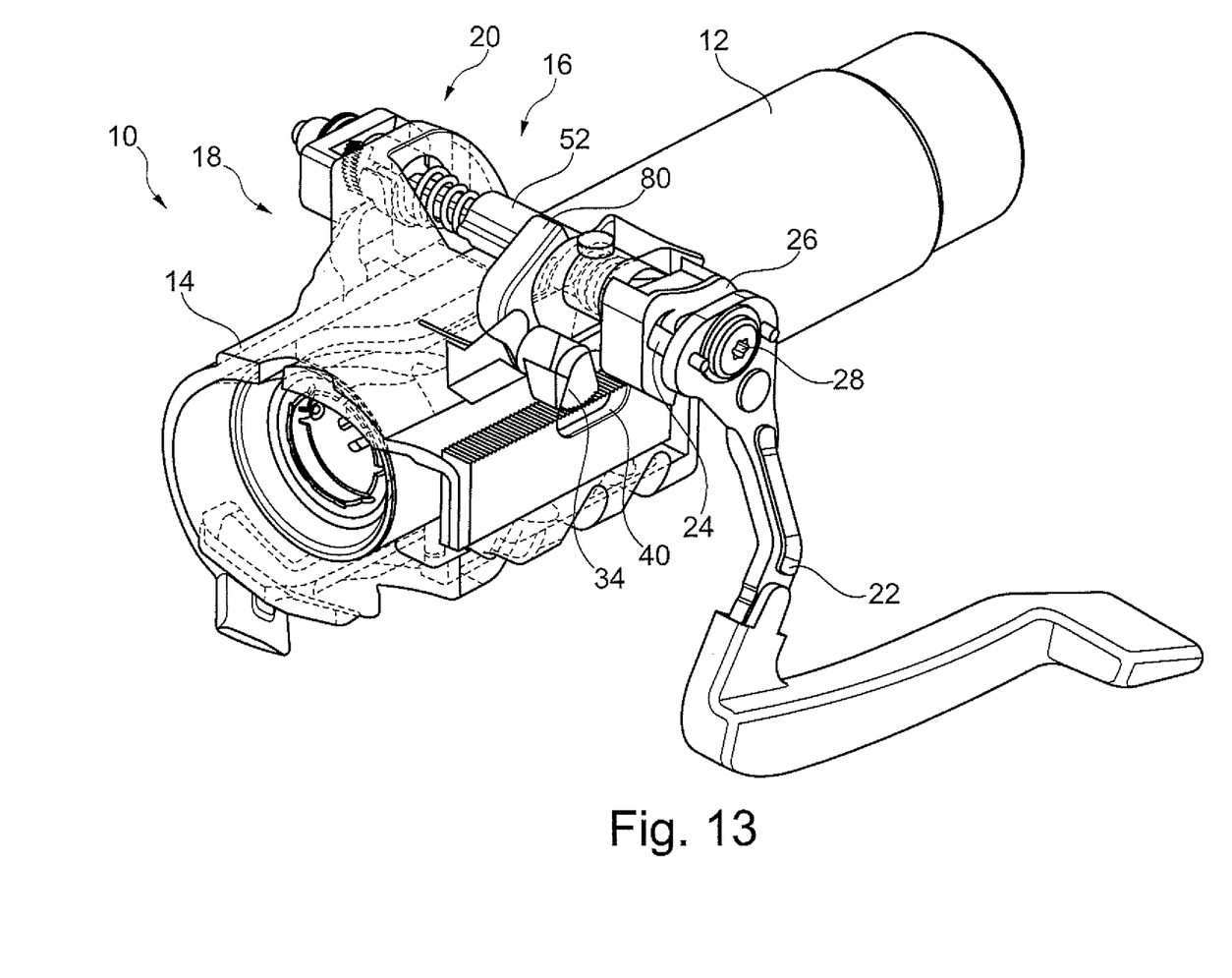
FIG. 13 is a perspective view of a steering column assembly according to the invention according to a second embodiment of a locking device.
Figures 14, 15, 16, 17:
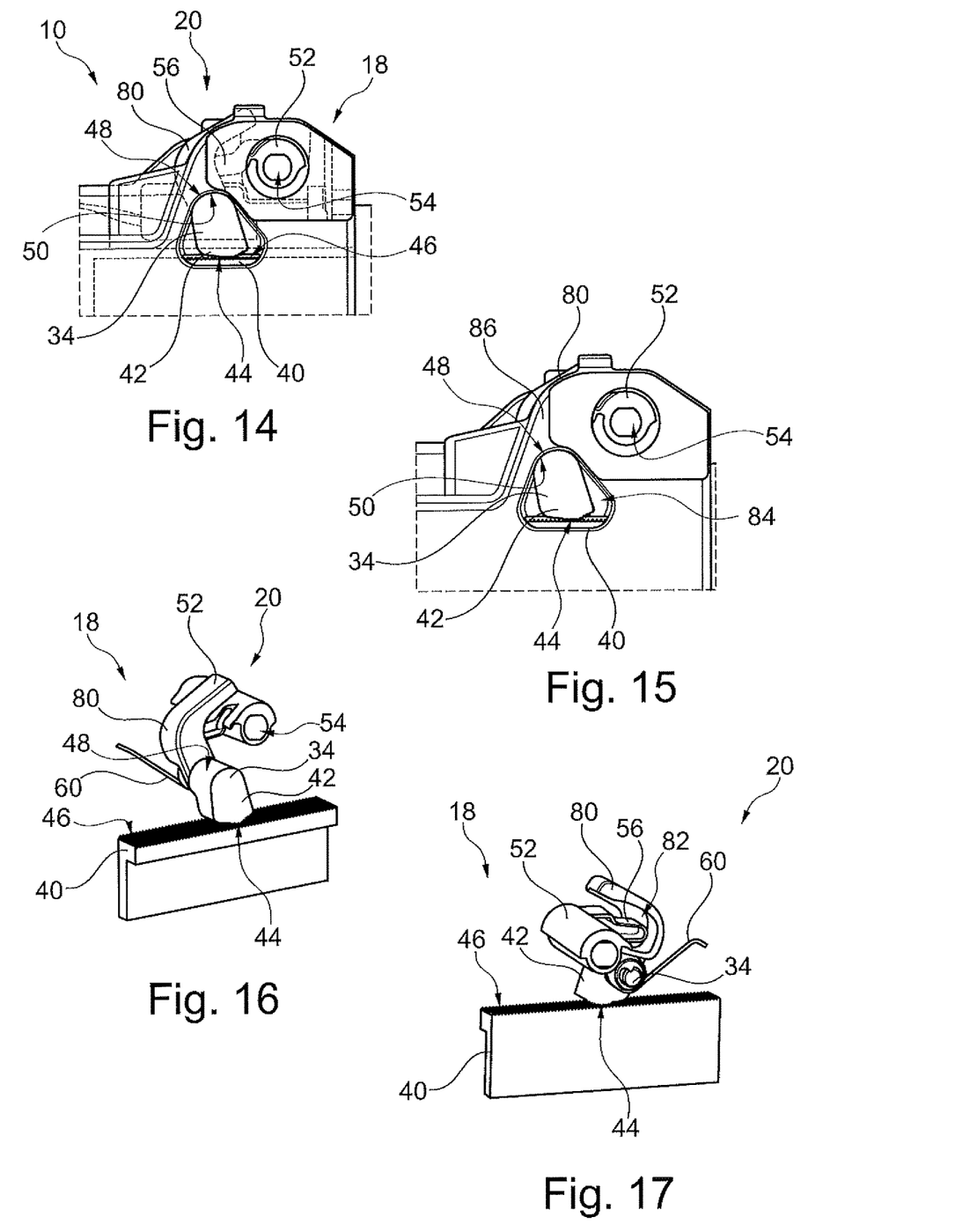
FIG. 14 is a side view of the steering column assembly of FIG. 13.
FIG. 15 is a further side view of the steering column assembly of FIG. 13.
FIG. 16 is a detailed view of the steering column assembly of FIG. 13.
FIG. 17 is a further detailed view of the steering column assembly of FIG. 13.

FIG. 12 shows how the control element 28 has been rotated further towards the open position, so that a pretension between the control element 28 and the adjusting member 52 is generated, which acts upon the adjusting member 52 in the open position. The control element 28 via its flattened portion 32 rests against a support of the receptacle 54 of the adjusting member 52, in order to pretension the adjusting member 52 in the open position, accordingly. Therefore, the pretension occurs due to the shape of the receptacle 54, which has a substantially butterfly shape in cross-section. The further eccentric part 63 may act in an analogous manner to the eccentric part 34, so that there is a corresponding homogeneous effect, which is provided at opposite ends.

Alternatively, it may be provided that the further eccentric part 63 is formed substantially in a mirror-inverted manner with respect to the first eccentric part 34, so that said part is meshed in the associated retaining part 40 when a force acts in an opposite direction to the accident situation. In this respect, the further eccentric part 63 has a reverse working direction opposite the first eccentric part 34. Accordingly, for example, a force acting externally on the steering column assembly 10 causes that the first eccentric part 34 is meshed into the associated retaining part 40, whereas a force acting on the steering wheel causes that the further eccentric part 63 is meshed into the other associated retaining part 40.

In general, the two retaining parts 40 associated to the eccentric parts 34, 63 may also be formed by a single retaining part 40, which comprises a corresponding geometry and the retaining parts 40 associated to the two eccentric parts 34, 63. Irrespective of the design of the locking portions 42 of the two eccentric parts 34, 63 via which the working direction of the eccentric parts 34, 63 is defined, the two eccentric parts 34, 63 have a common direction of rotation which is predetermined by the control element 28.

Generally, a locking device 20 and a steering column assembly 10 is provided, comprising a rotationally activatable adjustment mechanism 16 and locking mechanism 18 requiring no axial motion component for unlocking. In this respect, the locking device 20 is suitable to be used in an activation mechanism which provides only a limited opening stroke, as is the case with a "Head Over Pin" design. Due to the designed locking device 20, it is guaranteed that an adaptive load absorption is present, which means that the clamping or adjustment mechanism 16 is intensified with an increasing load, since the eccentric part 34 is meshed into the retaining part 40 accordingly.

In FIGS. 13 to 20, a further embodiment of the steering column assembly 10 and the locking device 20 is shown in different illustrations, which will explain how the blocking or locking of a longitudinal adjustment of the steering column assembly 10 is possible by means of the locking device 20. In the embodiment shown, the locking device 20 extends above the inner tube 12 and the outer tube 14.

FIGS. 14 to 17 show the components of the locking mechanism 18 provided for locking the longitudinal adjustment of the steering column assembly 10. As in the first embodiment, an adjusting member 52 is shown, which comprises a receptacle 54 via which the adjusting member 52 is (non-rotatably) coupled to the control element 28. The adjusting member 52 acts on its entrainment portion 56 together with a separately formed lever 80, which has a recess 82 in which the entrainment portion 56 is engaged so that the entrainment portion 56 may move relative to the lever 80 (see FIG. 17). The lever 80 is in turn coupled to the eccentric part 34, in particular rotatably arranged, so that the lever 80 adjusts the eccentric part 34 when the control element 28 actuates the lever 80 and the eccentric part 34. Moreover, a (further) spring 60 formed as a torsion spring is provided, via which the eccentric part 34 may be pretensioned in the closed position. The (further) spring 60 is supported, for example, on the lever 80 and/or on a vehicle-fixed component 86.

Generally, a reversal of the direction for the opening and closing movement is achieved, via the lever 80, which is necessary in the embodiment shown. The control element 28 rotates here during its closing movement counter-clockwise, since the operating unit 22 must be activated accordingly, whereas the eccentric part 34 is moved clockwise to be transferred from its open position to the closed position. Otherwise, as in the previous embodiment, the eccentric part 34 over its locking portion 42 engages on the engaging portion 46 in the closed position, wherein the eccentric part 34 over its force transmission portion 48 is supported at the same time on an associated support surface 50. Both the engaging portion 46 and the support surface 50 are formed on a common retaining part 40 which is formed by an edge of an indentation 84 on the vehicle-fixed component 86.

In this respect, the eccentric part 34 becomes jammed between the support surface 50 and the engaging portion 46 in a manner analogous to the previous embodiment, when it is in a closed position in the event of an accident as there is a higher friction at the side of the eccentric part 34 associated with the locking portion 42, in particular due to the locking surface 44. This is clearly apparent from FIGS. 18 to 20 in which the same side view is shown as in the steering column assembly 10 according to the first embodiment. This may be viewed by comparing FIGS. 18 to 20 and FIGS. 4 to 6. As already described, due to the accident and the forces occurring thereby, the rotation axis of the eccentric part 34 is displaced relative to the inner tube 12 and the outer tube 14 by the distance L, so that it becomes jammed.

Figure 18:
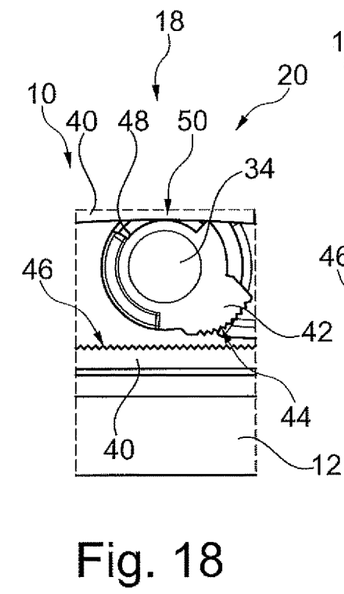
FIG. 18 is a side view of the steering column assembly according to FIG. 13 in an open position.
Figure 19:
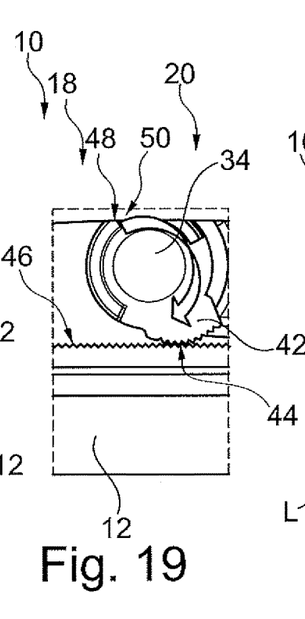
FIG. 19 is the view of FIG. 18 in a closed position.
Figure 20:
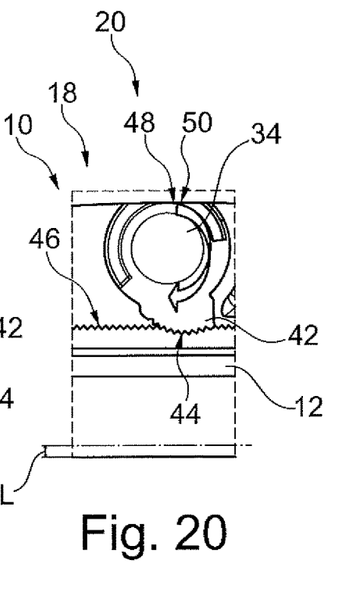
FIG. 20 is the view of FIG. 18 in an accident situation.

FIGS. 18 to 20 show clearly how the eccentric part 34 due to the increased friction at the side associated with the locking portion 42 unrolls over said side on the retaining part 40 to be meshed or jammed between the support surface 50 and the engaging portion 46. This occurs in an analogous manner in the first embodiment, so reference is made to the above statements. In this respect, also in this embodiment, the locking mechanism 18 and the clamping mechanism 16 or the clamping function is equipped with an adaptive load absorption, because the eccentric part 34 is meshed or jammed more strongly in an accident with an increasing load.

Figure 21:
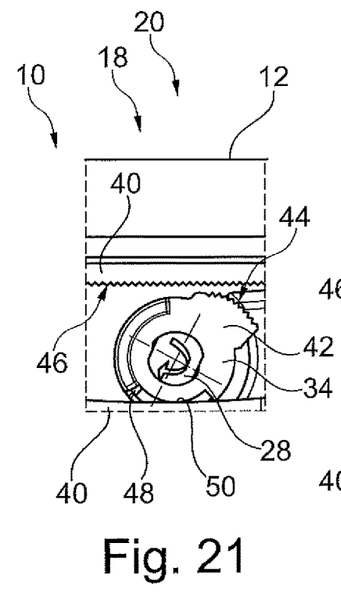
FIG. 21 is a side view of a steering column assembly according to the invention according to a third embodiment in an open position.
Figures 22, 23:
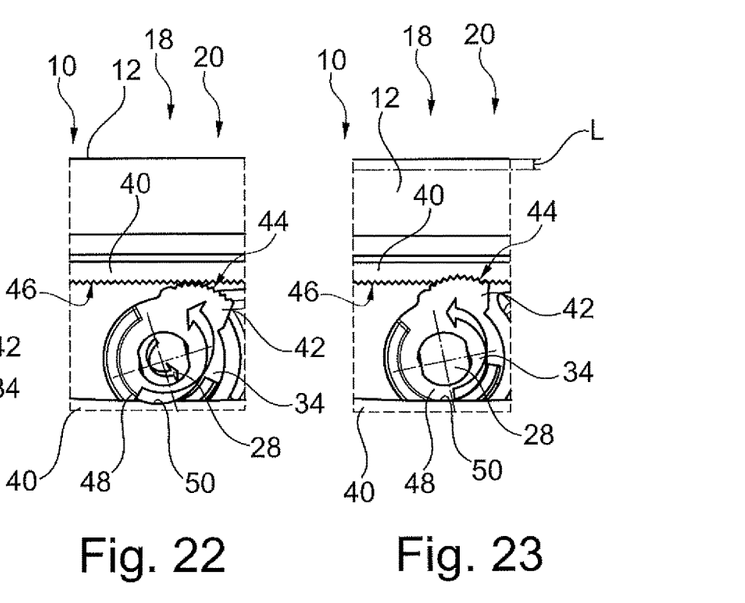
FIG. 22 is the view of FIG. 21 in a closed position.
FIG. 23 is the view of FIG. 21 in an accident situation.

In FIGS. 21 to 23, a further embodiment of a steering column assembly 10, and a locking device 20 is shown, in which FIGS. 21 to 23 represent the same side view as FIGS. 18 to 20. In this embodiment, the locking device 20 in particular the control element 28 is arranged below the inner tube 12. In this respect, the same working directions occur for the actuating kinematics of the locking device 20 as for the actuating kinematics of the first embodiment. Accordingly, a translation of the rotation direction is not necessary, for which reason the eccentric part 34 may interact directly with the control element 28, as also was the case for the first embodiment.

The only difference between this embodiment and the first embodiment is that the eccentric part 34 is provided for locking or blocking a longitudinal adjustment instead of a tilt adjustment. In this respect, the statements made for the first embodiment are applied in an analogous manner for the third embodiment, in particular with respect to the contours and shapes of the control element 28 and the receptacle 36 of the eccentric part 34, including the butterfly shape.

The first and the second or third embodiment may be combined together to provide a steering column assembly 10 or a locking device 20, which simultaneously may lock or block a tilt adjustment and a longitudinal adjustment. In this respect, the locking device 20 may be used for the adjustment mechanism 16 accordingly, while the adjustment mechanism 16 is used for both the tilt adjustment and the longitudinal adjustment.

In general, the locking device 20 may be used for locking or blocking a longitudinal adjustment or a tilt adjustment of the steering column assembly 10, This depends in particular on the relative orientation of the eccentric parts 34 and the associated retaining parts 40.

The invention claimed is:

1. A locking device for an adjustable steering column assembly of a motor vehicle, comprising:
   an operating unit which has at least one closed position and one open position,
   a control element coupled to the operating unit,
   a retaining part having an engaging portion, and
   at least one eccentric part configured to be rotated by the control element relative to the retaining part as the operating unit moves between the closed and open positions, the eccentric part having a locking portion and a force transmission portion that is substantially opposite the locking portion, wherein when the operating unit is in the closed position, the locking portion of the eccentric part engages the engaging portion of the retaining part and the force transmission portion rests against a support surface lying substantially opposite to the engaging portion, the eccentric part, in the closed position, being configured to be further rotated by a load applied to the eccentric part to more deeply engage the locking portion in the engaging portion, the eccentric part deforming the support surface as the eccentric part is further rotated by the load to more deeply engage the engaging portion.

2. The locking device according to claim 1, wherein the eccentric part has a receptacle for the control element through which the control element extends with an actuating portion, and wherein the actuating portion and the receptacle are formed in a manner that the control element is rotatable relative to the eccentric part.

3. The locking device according to claim 2, wherein the receptacle has at least one support section against which the actuating portion rests in the open position.

4. The locking device according to claim 3, wherein the support section has at least two support areas which are shifted from each other by an angle, wherein the angle falls between 10° and 30°.

5. The locking device according to claim 1, wherein the control element comprises a substantially circular cross-section with at least one flattened portion.

6. The locking device according to claim 5, wherein a receptacle has at least one support section against which an actuating portion rests in the open position, the support section having at least two support areas which are shifted from each other by an angle, the at least one flattened portion in the open position resting directly against a first one of the support areas.

7. The locking device according to claim 5, wherein the control element has two flattened portions that are parallel to each other.

8. The locking device according to claim 1, wherein the locking portion has an outwardly facing locking surface with a higher friction, wherein the locking surface comprises a corrugation and/or a toothing.

9. The locking device according to claim 1, wherein the control element receives no force in the closed position.

10. The locking device according to claim 1, wherein a spring is provided, which pretensions the at least one eccentric part in the closed position.

11. The locking device according to claim 1, wherein an adjusting member is provided, which interacts with the control element and is non-rotatably coupled to the control element.

12. The locking device according to claim 11, wherein a spring is provided that pretensions the at least one eccentric part in the closed position, the adjusting member having an entrainment portion interacting with the spring.

13. A steering column assembly for a motor vehicle, comprising:
   an inner tube,
   an outer tube, and
   an adjustment mechanism, via which a relative position of the inner tube with respect to the outer tube is adjustable,
   wherein the adjustment mechanism comprises a control element which is configured to rotate at least one eccentric part, via which the adjustment mechanism is locked in a closed position, and wherein in the closed position, the eccentric part directly engages an engaging portion, and rests against a substantially opposite support surface over a force transmission portion, the eccentric part, in the closed position, being configured to be further rotated by a load applied to the eccentric part to more deeply engage the engaging portion, the eccentric part deforming the support surface as the eccentric part is further rotated by the load to more deeply engage the engaging portion.

14. The steering column assembly according to claim 13, wherein a clamping mechanism is provided, which has a clamping function with an adaptive load absorption.

* * * * *